(12) United States Patent
Kowalski et al.

(10) Patent No.: US 7,596,757 B2
(45) Date of Patent: Sep. 29, 2009

(54) METHODS AND SYSTEMS FOR DIAGRAMMING AND REMOTELY MANIPULATING BUSINESS OBJECTS

(75) Inventors: Luke Kowalski, Belmont, CA (US); Arjuna Wijeyekoon, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 725 days.

(21) Appl. No.: 10/686,889

(22) Filed: Oct. 15, 2003

(65) Prior Publication Data

US 2005/0086092 A1 Apr. 21, 2005

(51) Int. Cl.
*G06F 3/048* (2006.01)
(52) U.S. Cl. .................. 715/763; 715/762; 715/964
(58) Field of Classification Search .............. 715/763; 717/104; 700/83, 17–21
See application file for complete search history.

(56) References Cited

U.S. PATENT DOCUMENTS

| | | | | |
|---|---|---|---|---|
| 5,596,704 | A * | 1/1997 | Geddes et al. ............... | 715/763 |
| 5,774,661 | A * | 6/1998 | Chatterjee et al. ........... | 709/203 |
| 7,110,835 | B2 * | 9/2006 | Blevins et al. ................ | 700/83 |
| 2002/0147624 | A1 * | 10/2002 | Yoshida et al. ................ | 705/8 |
| 2002/0178185 | A1 * | 11/2002 | Kuchinsky et al. .......... | 707/512 |
| 2004/0088678 | A1 * | 5/2004 | Litoiu et al. ................. | 717/104 |
| 2005/0044173 | A1 * | 2/2005 | Olander et al. .............. | 709/217 |

OTHER PUBLICATIONS

Naps and Bressler, "A multi-windowed environment for simultaneous visualization of related algorithms on the World Wide Web", SIGSE 1998, pp. 277-281.*
Visio 2002 Professional, Complete set of HELP files.
Visio 2000 Technical Edition, User Guide.

* cited by examiner

*Primary Examiner*—Stephen S Hong
*Assistant Examiner*—Omar Abdul-Ali
(74) *Attorney, Agent, or Firm*—Townsend and Townsend and Crew LLP

(57) ABSTRACT

A computer-implemented method of representing and manipulating a diagram that includes a representation of a plurality of interconnected business objects on a browser may include steps of displaying at least a portion of the diagram in an active area of the browser, displaying a diagram overview, the diagram overview including a representation of an entirety of the diagram and indicating a currently displayed portion of the diagram that is displayed in the active area. A selection of at least one of the plurality of business objects of the diagram displayed in the active area may be enabled. A selection of one of a plurality of canvas actions may then be enabled, each of the plurality of canvas actions enabling a user to take one of a corresponding plurality of actions on the selected at least one of the plurality of business objects. Contextual information regarding the diagram displayed in the active area may be displayed, as well as hierarchical information regarding the selected one of the business objects. The selected canvas action on the selected business object(s) may then be carried out. At least the active area of the browser may then be refreshed to display a revised portion of the diagram, the revised portion of the diagram incorporating any changes to the diagram as a result of carrying out the selected canvas action on the selected business object(s).

33 Claims, 8 Drawing Sheets

ARE YOU SURE THAT YOU WANT TO DELETE THIS NODE?

Warning

METHODS AND SYSTEMS FOR DIAGRAMMING AND REMOTELY MANIPULATING BUSINESS OBJECTS

BACKGROUND OF THE INVENTION

1. Field of the Invention

The present invention relates to computer-implemented methods, systems and network architectures for diagramming and remotely manipulating flows, processes, schema definitions, hierarchical and linear relationships or any other business object through a thin client.

2. Description of the Related Art

Current trends appear to favor self-service applications in which users can remotely log onto a Web application and carry out various operations. Such self-service Web applications allow employees to, for example, check their accumulated vacation time, allow customers to request refunds or returns and carry out like functions without human intervention. Conventionally, however, manipulating complex workflows, processes, schema definitions, hierarchical and linear relationships and like business objects through a web application has required that the user be technically savvy and required that a number of plug-ins be added to the browser to handle the graphic, control and/or data handling requirements of such applications. Such plug-in software modules may be difficult, time consuming and costly for IT departments to maintain over a larger network. Moreover, although many graphical programs exist to create a representation of such processes, the representations that these applications generate are mostly just that: representations and pictures. These representations generally do not have any functionality beyond providing the user with a graphical image of the underlying business objects such as a flowchart, a workflow, etc. Such images generally do not affect or have any connection to the underlying business logic, as stored in a business object layer including, for example, a database. For example, deleting a particular branch of a hierarchy that is graphically represented does not conventionally affect any other business logic associated with that hierarchy, as it is only the representation of the hierarchy that has changed, and not any logic coupled thereto.

For example, an employee hired might be represented as a new branch in a graphical representation of the company's managerial hierarchy. However, adding such a new branch in a graphical representation of the company's hierarchy does not, in itself, trigger additional logic and events in the company's database. For example, adding a representation of a new hire to a graphical representation of the company's hierarchy does not conventionally trigger the creation and/or execution of business logic to order equipment for the new hire, hook up his or her network connection or send an email to the new hire's supervisor, for example.

From the foregoing, it may be appreciated that what are needed are methods and systems that would allow users to create and modify graphical representations of business processes, logic and flows and to cause such representations to affect the business logic and objects represented by such graphical representations. What are also needed are methods and systems for carrying out such functionality in a thin client environment that implements, for example, a Web browser while minimizing the round trip delays for the transmission of control information and data between the thin client and the server.

SUMMARY OF THE INVENTION

In accordance with the above-described objects and those that will be mentioned and will become apparent below, an embodiment of the present invention is a computer-implemented method of representing and manipulating a diagram on a browser, the diagram including a representation of a plurality of interconnected business objects. The computer-implemented method may include steps of displaying at least a portion of the diagram in an active area of the browser, the active area being located in a first portion of the browser; displaying a diagram overview in a second portion of the browser, the diagram overview including a representation of an entirety of the diagram and indicating a currently displayed portion of the diagram that is displayed in the active area; enabling a selection of at least one of the plurality of business objects of the diagram displayed in the active area; enabling a selection of one of a plurality of canvas actions, each of the plurality of canvas actions enabling a user to take one of a corresponding plurality of actions on the selected at least one of the plurality of business objects; providing contextual information regarding the diagram displayed in the active area in a third portion of the browser; providing hierarchical information regarding the selected at least one of the plurality of business objects in a fourth portion of the browser; carrying out the selected canvas action on the selected at least one of the plurality of business objects, and refreshing at least the active area of the browser to display a revised portion of the diagram, the revised portion of the diagram incorporating any changes to the diagram as a result of carrying out the selected canvas action on the selected at least one of the plurality of business objects.

A step of enabling the displayed portion of the diagram to be panned left, right, up or down may be carried out through activation of pan controls disposed on each side of the active area of the browser. A step of enabling the active area of the browser to display a next adjacent quadrant of the displayed diagram upon detecting a predetermined user action may also be carried out. One or more of the business objects may include at least one hierarchically lower business object coupled thereto in a parent-child relationship. The method may also include a step of displaying the at least one hierarchically lower business object within the active area. A step of updating the contextual information displayed within the third portion of the browser to reflect the portion of the diagram currently displayed in the active area of the browser may also be carried out. The canvas actions may, for example, include add node, remove node, update node, move node, group nodes, view source of node, insert node, duplicate node, display node edges, connect nodes, refocus, view information about a node, define properties of a node, edit properties of a node and view node hierarchy. A step of refreshing the second portion of the browser may also be carried out to update the diagram overview to reflect any changes to the diagram overview as a result of carrying out the selected canvas action on the selected at least one of the plurality of business objects.

According to another embodiment thereof, the present invention is also a machine-readable medium having data stored thereon representing sequences of instructions which, when executed by computing device, causes said computing device to represent and enable manipulation of a diagram on a browser, the diagram including a representation of a plurality of interconnected business objects, by performing the steps of displaying at least a portion of the diagram in an active area of the browser, the active area being located in a first portion of the browser; displaying a diagram overview in a second portion of the browser, the diagram overview including a representation of an entirety of the diagram and indicating a currently displayed portion of the diagram that is displayed in the active area; enabling a selection of at least one of the plurality of business objects of the diagram displayed in the active area; enabling a selection of one of a plurality of canvas actions, each of the plurality of canvas actions enabling a user to take one of a corresponding plurality of actions on the selected at least one of the plurality of business objects; providing contextual information regarding the diagram displayed in the active area in a third portion of the browser; providing hierarchical information regarding the selected at least one of the plurality of business objects in a fourth portion of the browser; carrying out the selected canvas action on the selected at least one of the plurality of business objects, and refreshing at least the active area of the browser to display a revised portion of the diagram, the revised portion of the diagram incorporating any changes to the diagram as a result of carrying out the selected canvas action on the selected at least one of the plurality of business objects.

According to still another embodiment thereof, the present invention is a computer system suitable for representing and enabling manipulation of a diagram on a browser, the diagram including a representation of a plurality of interconnected business objects, comprising: at least one processor; at least one data storage device coupled to the at least one processor; a plurality of processes spawned by said at least one processor, the processes including processing logic for: displaying at least a portion of the diagram in an active area of the browser, the active area being located in a first portion of the browser; displaying a diagram overview in a second portion of the browser, the diagram overview including a representation of an entirety of the diagram and indicating a currently displayed portion of the diagram that is displayed in the active area; enabling a selection of at least one of the plurality of business objects of the diagram displayed in the active area; enabling a selection of one of a plurality of canvas actions, each of the plurality of canvas actions enabling a user to take one of a corresponding plurality of actions on the selected at least one of the plurality of business objects; providing contextual information regarding the diagram displayed in the active area in a third portion of the browser; providing hierarchical information regarding the selected at least one of the plurality of business objects in a fourth portion of the browser; carrying out the selected canvas action on the selected at least one of the plurality of business objects, and refreshing at least the active area of the browser to display a revised portion of the diagram, the revised portion of the diagram incorporating any changes to the diagram as a result of carrying out the selected canvas action on the selected at least one of the plurality of business objects. Alternatively, a refreshing operation may be carried out without being triggered by the user.

According to another embodiment thereof, the present invention is a computer implemented method for a user to remotely and graphically manipulate representations of business objects on a browser of a thin client coupled to a server over a network, the method comprising: displaying a diagram that includes a representation of a plurality of interconnected business objects on the browser; detecting an event triggered by the user on the displayed diagram on the browser; submitting a request associated with the triggered event to a controller, the controller being configured to interface between the thin client and a business object controlling application running on the server, the controller being configured to control page flow between the application and the browser on the thin client depending upon the detected event or upon a predetermined condition; changing the state of the business object controlling application on the server according to the detected event or the predetermined condition; receiving an answer from the controller in response to the submitted request, the received answer causing the browser to refresh its display of the diagram so as to reflect the changed state of the business object controlling application. A refreshing operation may be carried out without being triggered by the user.

The business controlling application may be coupled to a database that stores the data associated with the plurality of business objects and the method may further include a step of changing the data stored within the database to reflect the changed state of the business object controlling application. The answer from the controller may include a URL of a Web page.

According to another embodiment thereof, the present invention is a machine-readable medium having data stored thereon representing sequences of instructions which, when executed by computing device, causes said computing device to enable a user to remotely and graphically manipulate representations of business objects on a browser of a thin client coupled to a server over a network, by performing the steps of: displaying a diagram that includes a representation of a plurality of interconnected business objects on the browser; detecting an event triggered by the user on the displayed diagram on the browser; submitting a request associated with the triggered event to a controller, the controller being configured to interface between the thin client and a business object controlling application running on the server, the controller being configured to control page flow between the application and the browser on the thin client depending upon the detected event or upon a predetermined condition; changing the state of the business object controlling application on the server according to the detected event or the predetermined condition; receiving an answer from the controller in response to the submitted request, the received answer causing the browser to refresh its display of the diagram so as to reflect the changed state of the business object controlling application. A refreshing operation may be carried out without being triggered by the user.

The present invention, may also be viewed, according to another embodiment thereof, as a computer system enabling a user to remotely and graphically manipulate representations of business objects on a browser of a thin client coupled to a server over a network, the computer system comprising: at least one processor; at least one data storage device coupled to the at least one processor; a plurality of processes spawned by said at least one processor, the processes including processing logic for: displaying a diagram that includes a representation of a plurality of interconnected business objects on the browser; detecting an event triggered by the user on the displayed diagram on the browser; submitting a request associated with the triggered event to a controller, the controller being configured to interface between the thin client and a business object controlling application running on the server, the controller being configured to control page flow between the application and the browser on the thin client depending upon the detected event or upon a predetermined condition; changing the state of the business object controlling application on the server according to the detected event or the predetermined condition; receiving an answer from the controller in response to the submitted request, the received answer causing the browser to refresh its display of the diagram so as to reflect the changed state of the business object controlling application. A refreshing operation may be carried out without being triggered by the user.

DESCRIPTION OF THE INVENTION

Functional Description

Figure 1:
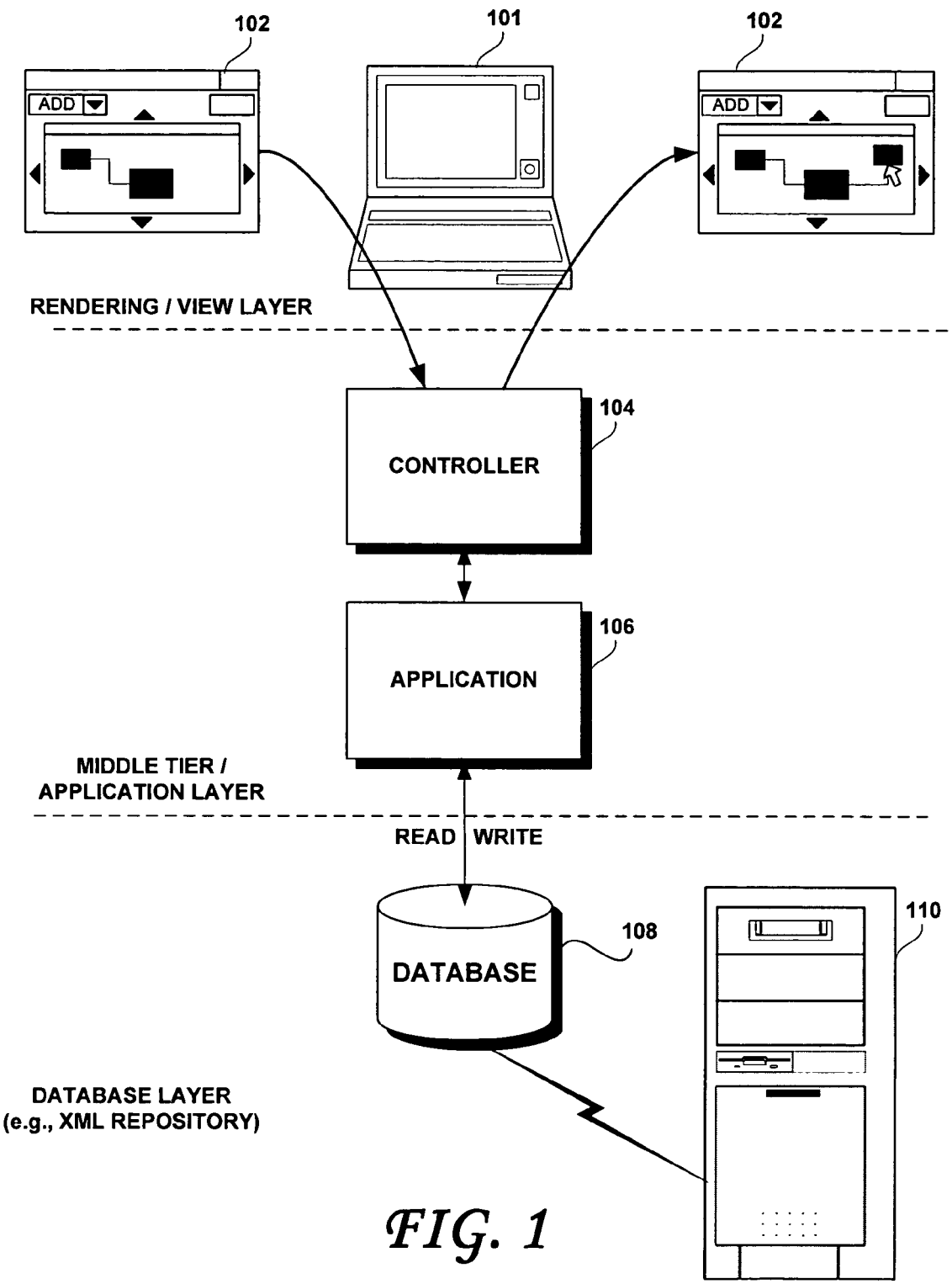
FIG. 1 is a diagram illustrating components of the system for graphically manipulating business objects, according to an embodiment of the present invention.

FIG. 1 is a diagram illustrating the major components of the system for graphically manipulating business objects, according to an embodiment of the present invention. A business object, according to embodiments of the present invention, is a broadly inclusive concept that encompasses business information as well as associated business methods and logic for acting upon the business information. For example, a business object may include a sales order, in which the business information may include, for example, the nature and quantity of the items ordered, requested delivery dates and the like, whereas the business methods may include any actions that are necessary to fill the sales order, such as the issuance of orders to inventory, shipping, costing and accounting applications, for example. As shown in FIG. 1, the system 100 may include three logical layers, including the rendering or view layer, the middle tier or application layer and the database layer, which may include a database 108 such as an XML repository, for example. In the rendering layer, a browser 102 implemented by a thin client 101 is shown. The browser 102 (such as, for example, Microsoft's Internet Explorer version 5.0 and above, for example) need not include plug-ins, such as Microsoft's VML, Adobe's SVG or Macromedia's Flash, for example. According to embodiments of the present invention, all that is required for the browser 102 is the ability to make HTTP requests and render to Web pages. The browser 102 may incorporate other functionalities and/or plug-in software modules, but such are not required according to embodiments of the present invention. The computer (e.g., a personal computer 101) running the browser 102 may be coupled to the middle tier through a computer network (not shown), which may include the Internet, for example. The browser 102 may be coupled to a controller 104. The controller 104, according to an embodiment of the present invention, allows the grouping of Web pages to form a Web application, and provides the ability to control page flow between Web pages depending upon, for example, user input or predetermined conditions. Functionally, the controller 104 resides on a server and examines each HTTP request between the thin client 102 and the server 110. Depending upon the data the user has entered and/or other predetermined conditions, the state of the server 110 (and that of the database 108 or other repository), and the results returned from handlers in the application 106, the controller 104 determines which Web page to cause the browser 102 to display next, while performing operations on the data in the process. Advantageously, the controller 104 may include Oracle Corporation's UIX controller, such as described in Oracle Corporation's "UIX Developer's Guide, UIX release 2.1.7", Chapter 5, "Introducing the UIX Controller", and "Oracle 9i XML Developer's Kits Guide—XDK Release 2 (9.2) Part Number A96621-01", the contents of each of which is incorporated herein in its entirety. However, other controllers may also be used within the context of the present invention.

Conventionally, static HTML pages are linked together with hardcoded HTML links. This means that the page flow is static—clicking on a link always sends the user to the same HTML page. However, in most Web applications, it is necessary to dynamically choose a page to go to when a link is activated or a form is submitted. This decision may be made depending on the data submitted by the user or the state of the server. Moreover, while making this decision, the state of the server may change.

The controller 104 has the ability to indicate which links or form submissions require special processing. All requests from the thin client 102 are received by the controller 104 and by default, and the controller 104 serves up the page or pages requested by the thin client request. However, the controller 104 may also recognize a special signal known as an "event". Any link or form submission may be encoded to trigger an event. When a user clicks or otherwise selects a link encoded to trigger an event via the thin client 102, the controller 104 may execute specific code to handle the event, and may modify the state of the server 110 in the process. The controller 104 may then use the result of the execution of the code to determine which page to render in response to the event. Events, according to an embodiment of the present invention, are the mechanism by which applications, such as application 106, interact with the controller 104 to modify the state of the server 110 (and that of the database 108, for example) in the process. An event may be designated by a URL, with a number of parameters. The application 106 may include any application that is rendered by the browser 102 and acts upon a data store such as the database 108 through the controller 104. According to one embodiment of the present invention, the application 106 may include the graphical diagram editor disclosed below and shown in FIGS. 2 through 7 or a functionally similar graphical editor.

Figure 2:
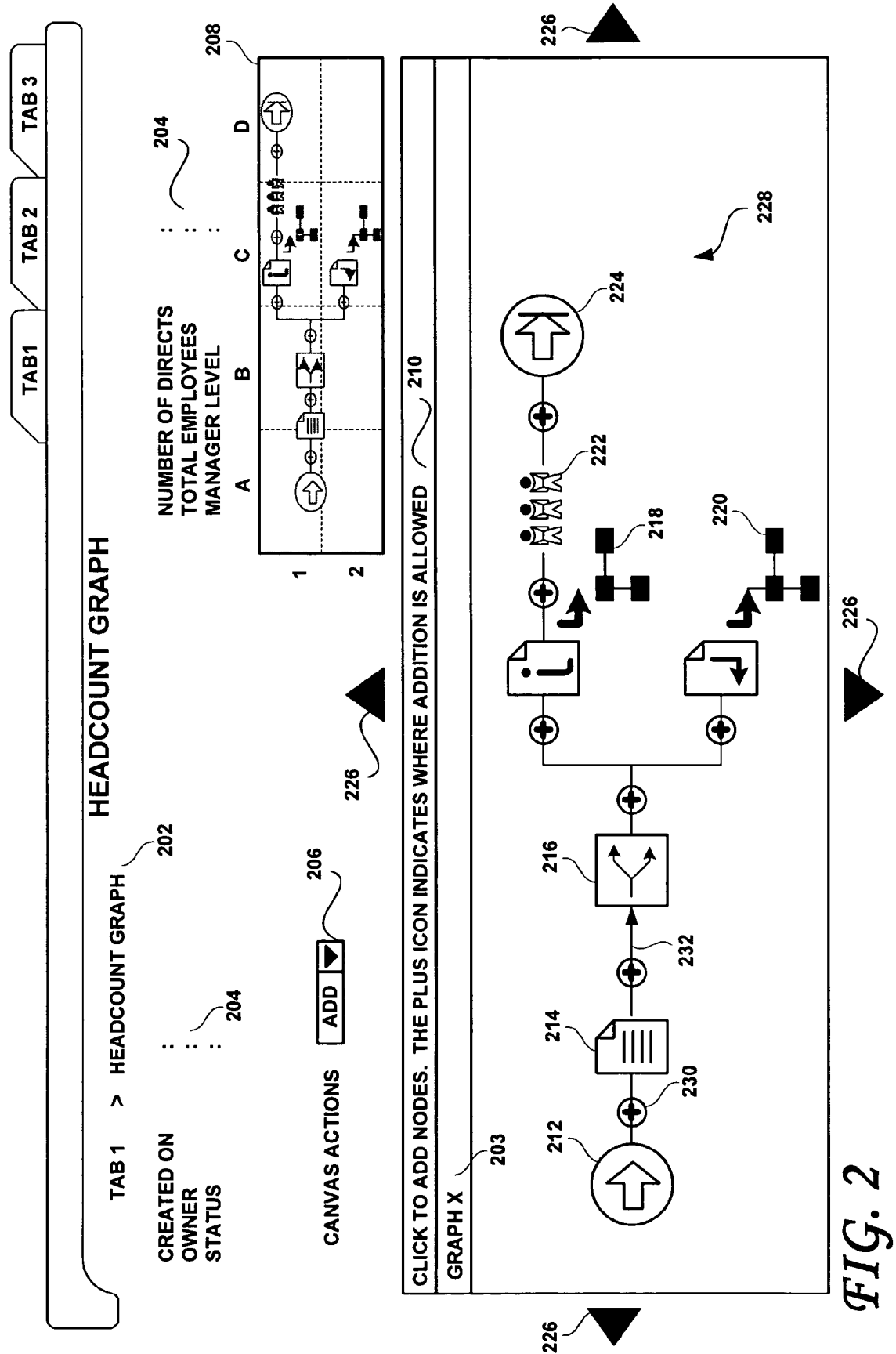
FIG. 2 shows major components of the graphical diagram editor, according to an embodiment of the present invention.

FIG. 2 shows major components of a graphical diagram editor, according to an embodiment of the present invention. As shown therein, this Web application may be rendered on a browser, such as shown at 102 in FIG. 1. The diagram editor, according to an embodiment thereof, may include a diagram active area 228, in which a plurality of nodes are displayed and interconnected. Examples of nodes (each of which may be or include one or more business objects) are shown at 212, 214, 216, 218, 220, 222 and 224. The diagramming application may include so-called application breadcrumbs 202, which tell the user the location of the current diagram and allow the user to navigate back through the path leading to the diagram. So-called diagram breadcrumbs 203 may also be included. When the user opens up a sub-process or drills down to see the children of a node, the parent-child relationship of the nodes may be displayed at 203. For example, the diagram breadcrumbs may include two strings, including the name of the graph ("Graph X" in the example of FIG. 2), appended with the name of the grouped sub-process/child group. Contextual information regarding the graph may be included at 204. The contextual information may include general information about the diagram, which information may be (selectably) read only or editable. Exemplary fields are shown at 204, including fields related to the characteristics of the diagram file (such as, for example, created on, owner, status) as well as substantive information relating to the contents of the diagram (in this case, number of directs, number of employees, manager level, for example).

Embodiments of the present Web-based graphical diagramming application may also include canvas actions, shown in FIG. 2 at 206. Canvas actions, according to an embodiment of the invention, enable the user to control the behavior of the diagramming application and/or the appearance of the active region 228 when the user clicks or otherwise points to the diagram. As shown in FIG. 2, the selected canvas action at 206 is the "Add" mode. For example, once the "Add" mode is selected, the messaging area pointed to by reference numeral 210 may display instructional text, may prompt the user to carry out some action (e.g., select, group), may indicate which node(s) is/are selected and/or may include Cancel and Select actions, for example. Examples of possible canvas actions, according to embodiments of the present invention, may include (but are not limited to), for example,

- Add/Remove node;
- Update node (default canvas action). Add and Update may be combined.
- Move node;
- Group node;
- View Source of node (Click node and go to the object (i.e., URL of the object) represented by that node, at run time;
- Insert node before or after existing node
- Duplicate node;
- Display Node Edges (selecting several nodes and being provided with the detailed-attribute-level-relationships between the selected nodes;
- Connect (similar to Group canvas action, with the exception that this canvas action only connects selected objects and does not group them);
- Refocus (this canvas action makes the selected node the focus of the displayed diagram). A floating window may provide the properties of the selected node.
- View information about a node;
- Define/Update properties of a node;
- Pan;
- View Children of a node, node hierarchies.

Other canvas actions 206 may also be envisaged and implemented, as those of skill in this art may recognize. When the canvas mode is selected to be "Add" as shown at 206, Add/Move target indicators 230 may be shown in the active region 228, providing a visual cue to the user indicating that an additional node or nodes may be added in a given location. The Add/Move target indicators may be configured so as to only appear when the canvas mode is set to Add or Move. Other indicators and/or other cues or items may be shown in the active region 228 depending upon the selected canvas mode.

Reference numeral 208 designates the diagram overview. The diagram overview 208 is used for navigating to a specific quadrant of the overall diagram, which specific quadrant or area may be identified by an alphanumerical pair (e.g., quadrant B1). Initially, the entire diagram may be visible or centered within the diagram overview 208 when the diagram is larger than the window. Reference numeral 232 designates a flow status indicator that may be used to indicate the progress of a predefined sequence of steps. Such flow status indicators are product and implementation specific. According to an embodiment of the present invention, clicking or otherwise selecting a quadrant within the diagram overview 208 will cause the selected quadrant of the diagram to become visible in the active region 228. The diagram overview 208 aids the user in navigating through large and complex diagrams by providing a visual indication (e.g., a highlighted portion of the overview) to the user of the location of the currently displayed portion of the diagram in the active area 228 relative to the larger, complete diagram. In the case of the exemplary diagram shown in FIG. 2, the entire diagram may be shown in the active region 228. That is, the diagram shown in the diagram overview 208 is duplicated at a larger scale in the active region 228. According to an embodiment of the present invention, had the exemplary diagram shown in FIG. 2 been much larger, only a portion thereof would have fit in the active region 228 whereas the entire drawing would have been shown in the diagram overview 208.

Nodes within the diagram may represent processes (parents) and/or sub-processes (children), for example. Such sub-processes or children nodes are shown in the diagram at reference numerals 218 and 220. Clicking or otherwise selecting such an icon allows the user to navigate to a nested flow or nested nodes. Such a flow or children nodes may be opened within the existing view of the diagram or replace the existing view within the active region 228, showing only the children nodes. In any event, a pointer back to the parent flow, process or node may be provided. To aid in navigation, sub-process breadcrumbs may surface and become visible when the nested flow or children are viewed, to enable the user to maintain the context of the viewed children within the overall hierarchy or workflow, for example. To ease navigation through a diagram that may be larger than the active area 228, pan controls 226 may be provided on each side of the active area 228. Using such pan controls 226, the user is able to pan up, down, left and right by clicking on or otherwise selecting a selected pan control arrow 226. The present diagramming application may be configured such that, by clicking a certain number of times on a single pan control 226, the user may jump to a next adjacent quadrant in the direction of the pan control arrow 226. When the entire diagram is in full view within the active area 228, the pan controls 226 may be grayed out, rendering them inoperative. A dotted line extending from a node out to an edge of the currently displayed portion of the active area may be used to indicate that the diagram extends beyond that portion of the active area 228 that is currently visible.

Figure 3:
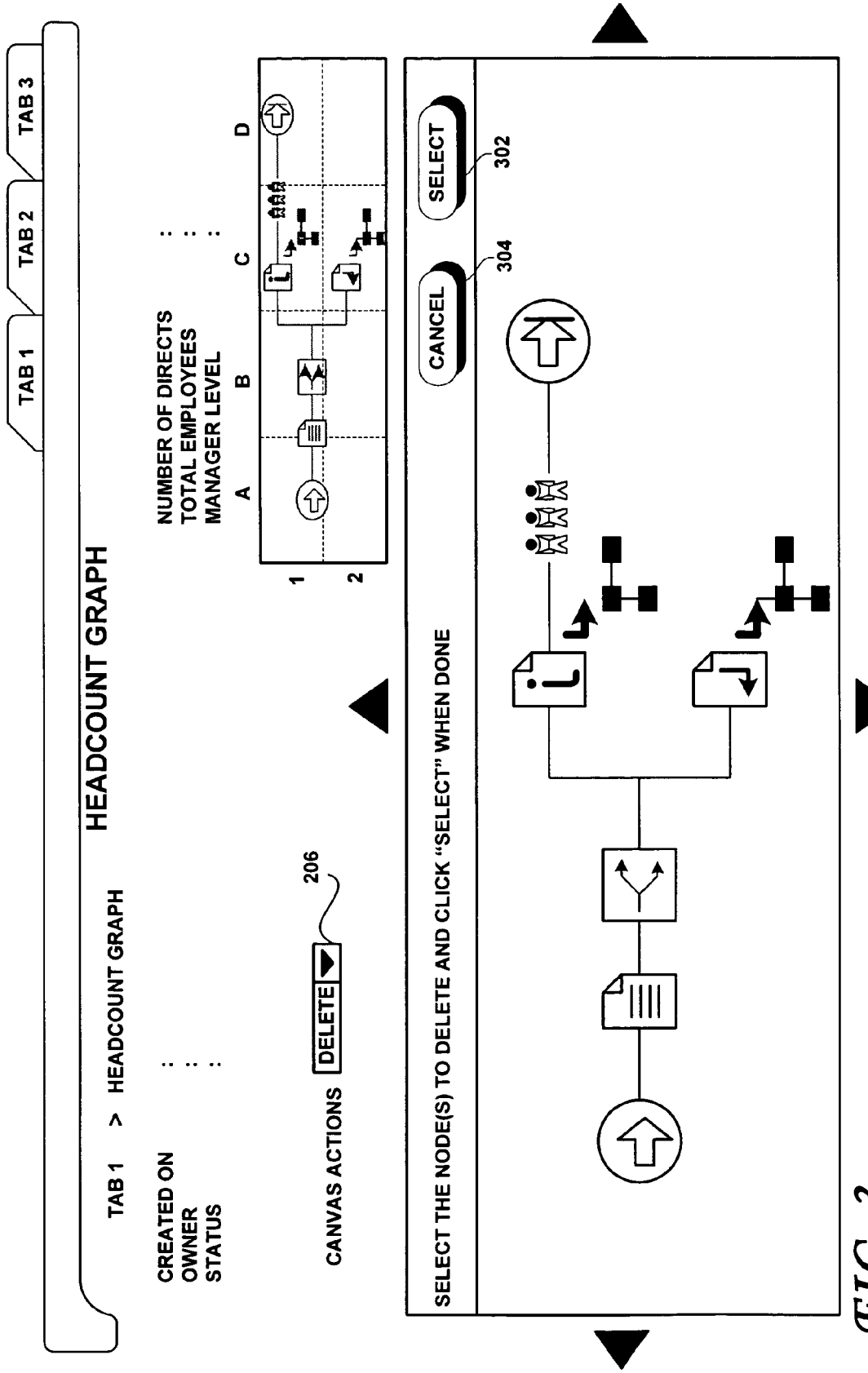
FIG. 3 shows the graphical diagram editor in another state, according to an embodiment of the present invention.
Figure 4:
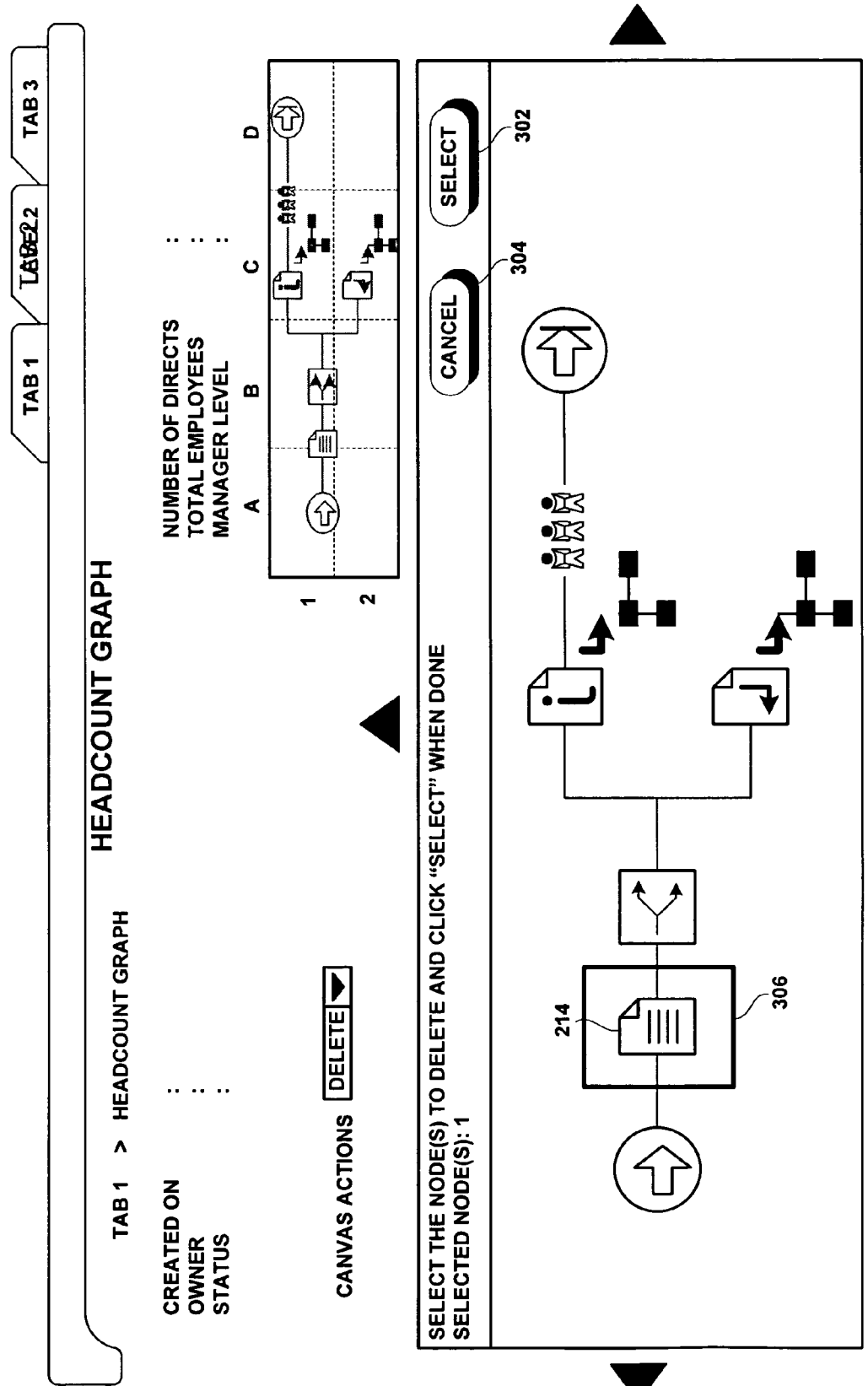
FIG. 4 shows the graphical diagram editor in another state, according to an embodiment of the present invention.
Figure 5:
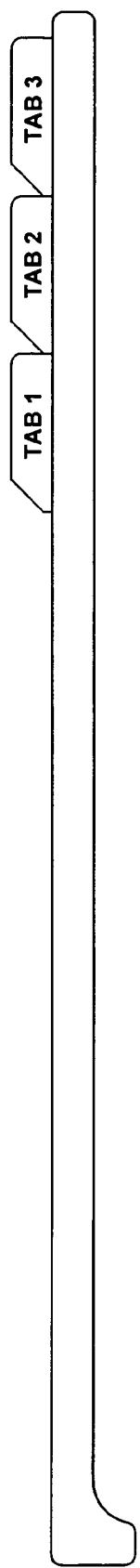
FIG. 5 shows the graphical diagram editor in another state, according to an embodiment of the present invention.
Figure 5:
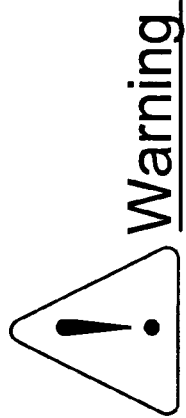
Figure 6:
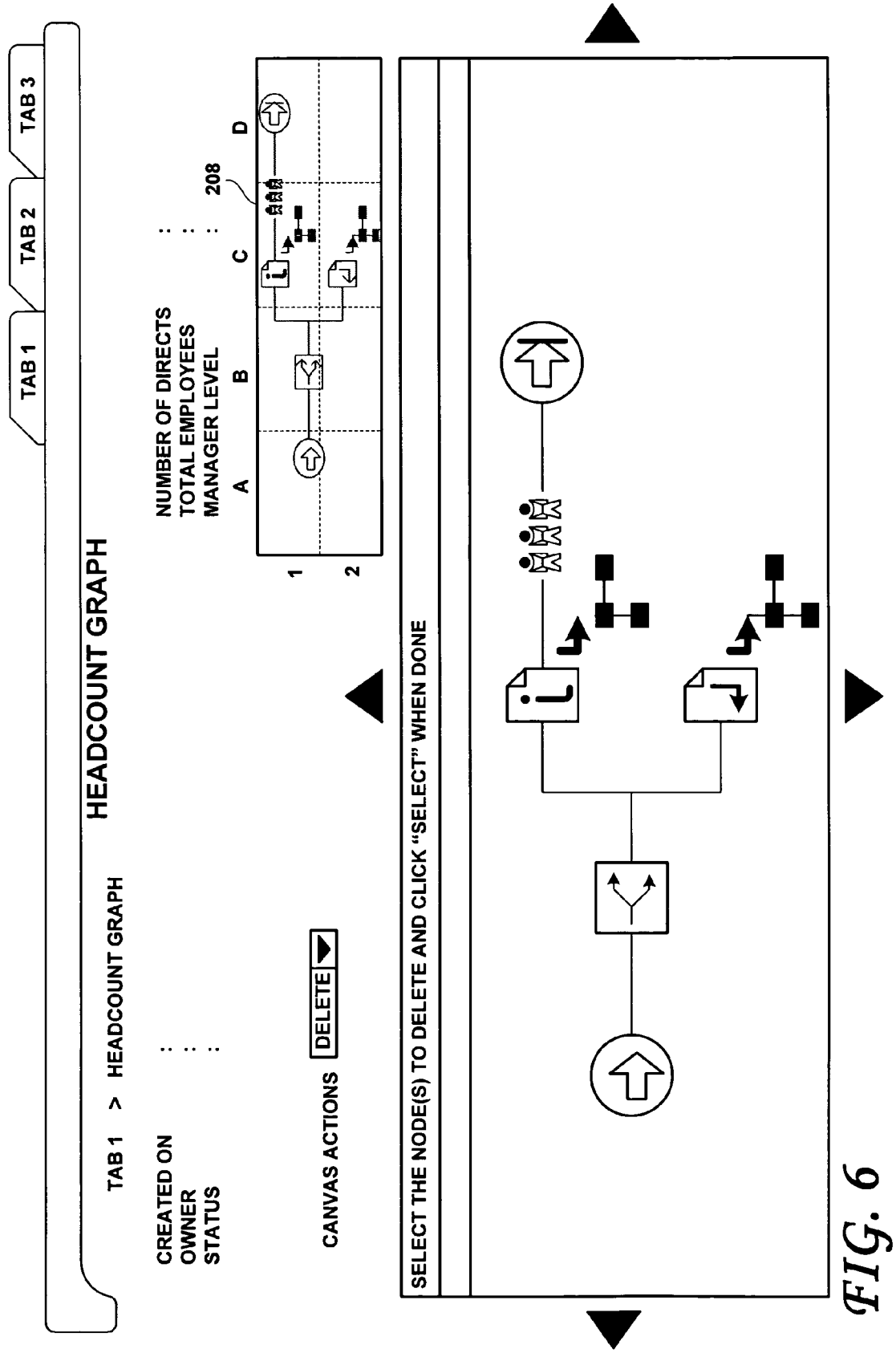
FIG. 6 shows the graphical diagram editor in yet another state, according to an embodiment of the present invention.

FIG. 3 shows the diagramming Web application of FIG. 2, in which the canvas mode 206 is selected to be "Delete". Several nodes may be selected for deletion. After the node or nodes top be deleted are selected, the user may click on the "Select" button 302 or cancel the node delete operation by clicking the "Cancel" button 304. After the user has selected a node, such as node 214 in FIG. 4, the node may be highlighted, as shown at 306. An optional delete confirmation warning may then appear, as shown in FIG. 5. Optionally, the confirmation warning shown in FIG. 5 may appear within the active area 228. FIG. 6 shows the diagramming Web application of FIGS. 2 and 3 after the node 214 has been deleted and after the active area of the browser has been refreshed. As shown, the diagram overview 208 is suitably refreshed and updated to reflect the deletion of the node 214. A refreshing operation may be carried out without being triggered by the user.

Figure 7:
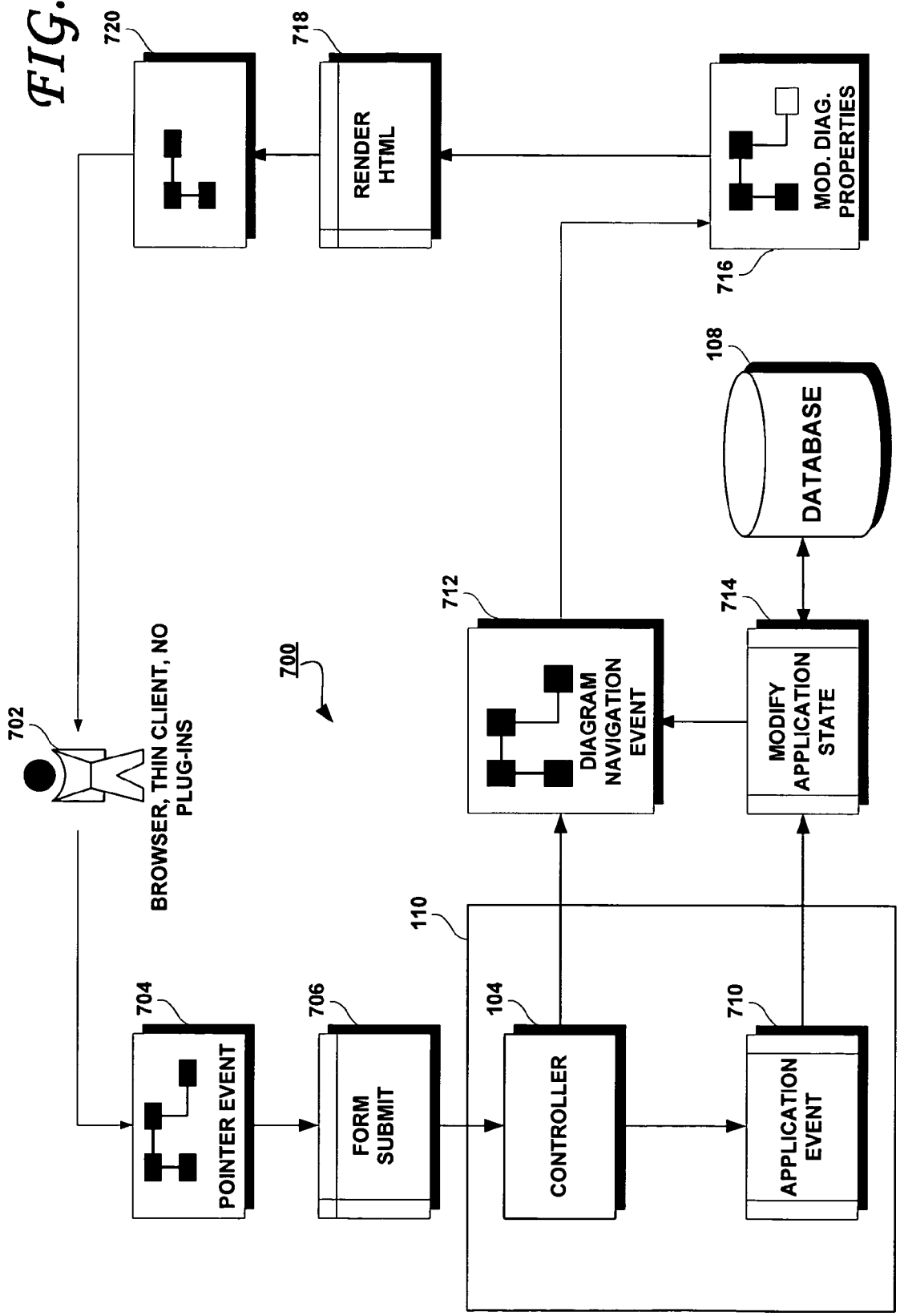
FIG. 7 illustrates aspects of the control flow for a method of remotely and graphically manipulating business objects, according to an embodiment of the present invention.

FIG. 7 illustrates aspects of the control flow 700 for a method to enable even non-technical users to remotely and graphically create, edit and otherwise manipulate business processes, objects, logic and flows, according to an embodiment of the present invention. The purely thin client implementation shown in FIG. 7 associates a dynamically rendered diagram with operations that affect downstream business logic. Embodiments of the present inventions separate the browser-rendered representation of the business processes, logic and flow from the business logic layer that carries out the operations symbolized by the representation thereof on the browser. As shown, the present diagramming Web application runs on a thin client, such as browser that does not necessitate plug-ins and like software add-on modules. The user, symbolized at 702, generates a pointer event at 704 by, for example, clicking or otherwise selecting a node (e.g., a representation of a business object) within the active area 228, the diagram overview 208 or a canvas action as described above. The present Web diagramming application may then submit one or more HTTP requests (shown in FIG. 7 as "Form Submit" 706) selected by the pointer event of reference numeral 704. The HTTP request(s) is/are then passed to the controller 104. The controller 104 provides the ability to control page flow between Web pages that are rendered on the user's browser depending upon, for example, user input and/ or predetermined conditions. Functionally, the controller 104 resides on a server and examines each HTTP request between the thin client 702 and the server 110 on which the controller 104 may reside. Depending upon the data the user has entered through the browser 702 and/or other predetermined conditions, the state of the server 110 (and that of the database 108 or other repository), and the results returned from handlers in the present Web diagramming application, the controller 104 determines which Web page to cause the browser to display next, while performing operations on the underlying data in the process.

If the controller 104 determines that the user interaction is solely a diagram navigation event that does not affect the underlying business processes, flows and logic represented in the diagram, control passes to 712, and thereafter to reference numeral 718, at which point the properties of the diagram to be shown on the browser 702 are modified according to the user's input. For example, the user might have panned the active area 228 or expanded a parent node to reveal previously hidden child nodes, without, however, affecting the logic represented by the diagram. As shown at 718, the HTML code of the changed representation of the diagram within the active area 228 and rendered, as suggested by 720, and provided to the user.

If, however, the controller 104 determines that the user interaction results in a change in the underlying business processes, flow or logic represented by the diagram in the active area 228, an application event may be triggered, as shown at 710. The application event triggered at 710 causes the state of the present Web diagramming application to change to reflect the triggered event. This change in the state of the diagramming application may be accompanied by corresponding changes and updates in the table or tables associated with the change in the database 108. This change in the state of the diagramming application then triggers a diagram navigation event, as shown at 712. This diagram navigation event updates the presentation of the underlying business process, flow and logic within the active area 228 according to the changed application state. This diagram navigation event 712 in turn causes the properties of the diagram displayed within the active area 228 to change, as shown at 716. As shown at 718 and in the manner described above, the HTML code reflecting the changed state of the Web diagram within the active area 228 is then rendered, as suggested by 720 and sent to the browser/thin client.

Hardware Description

Figure 8:
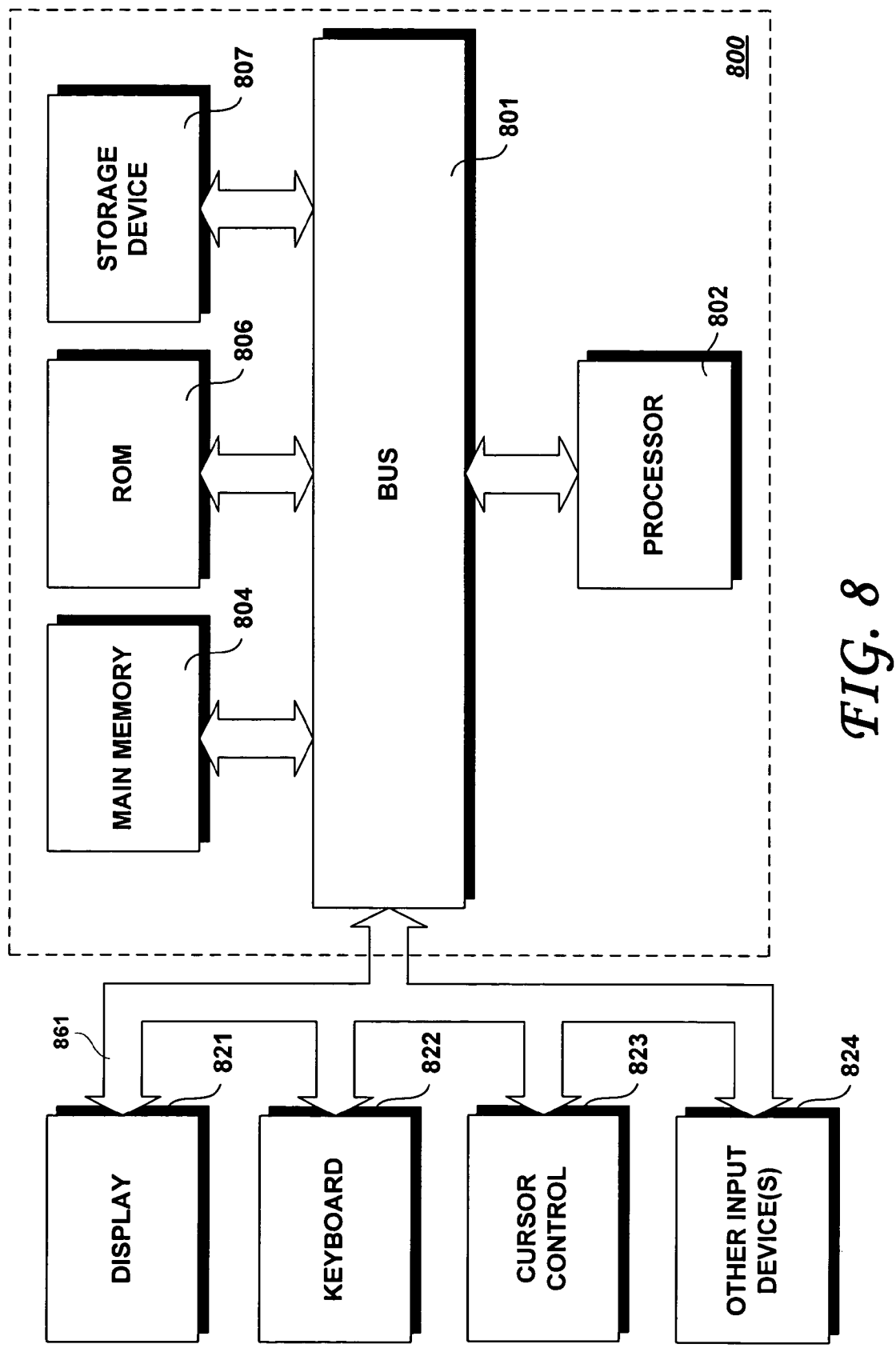
FIG. 8 is a block diagram of a computing device such as a mobile device or a computer, suitable for implementing the present invention.

FIG. 8 illustrates a block diagram of a computing device (including a mobile device, a desktop computer and/or a laptop computer, for example) 800 with which an embodiment of the present invention may be implemented. Computing device 800 includes a bus 801 or other communication mechanism for communicating information, and a processor 802 coupled with bus 801 for processing information. Computer device 800 further comprises a random access memory (RAM) or other dynamic storage device 804 (referred to as main memory), coupled to bus 801 for storing information and instructions to be executed by processor 802. Main memory 804 also may be used for storing temporary variables or other intermediate information during execution of instructions by processor 802. Computing device 800 also includes a read only memory (ROM) and/or other static storage device 806 coupled to bus 801 for storing static information and instructions for processor 802. A data storage device 807, such as a magnetic disk or optical disk, may also be coupled to bus 801 for storing information and instructions. A communication device 808, such as a modem or network adapter (such as Ethernet, for example) card is also coupled to the bus 801 to provide access to a network, such as the Internet, for example.

The computing device 800 may also be coupled via bus 861 to a display device 821, such as a liquid crystal display, for displaying information to a computer user. An alphanumeric input device 822, including alphanumeric and other keys, is typically coupled to bus 861 for communicating information and command selections to processor 802.

The present invention is related to the use of computing devices 800 to implement methods and systems for representing and manipulating a diagram on a browser and for remotely and graphically manipulate representations of business objects on a browser of a thin client coupled to a server over a network. According to one embodiment thereof, the system for representing and manipulating a diagram on a browser or for remotely and graphically manipulate representations of business objects on a browser of a thin client coupled to a server over a network may be provided by one or more computing devices 800 in response to processor(s) 802 executing sequences of instructions contained in memory 804. Such instructions may be read into memory 804 from another computer-readable medium, such as data storage device 807. Execution of the sequences of instructions contained in memory 804 causes processor(s) 802 to implement the methods disclosed herein. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A computer-implemented method of representing and manipulating a diagram on a browser, the diagram including a representation of a plurality of interconnected business objects, the computer-implemented method comprising the steps of:

displaying at least a portion of the diagram in an active area of the browser, the active area being located in a first portion of the browser;

displaying a diagram overview in a second portion of the browser, the diagram overview including a representation of an entirety of the diagram and indicating a currently displayed portion of the diagram that is displayed in the active area;

enabling a selection of a canvas mode of a plurality of canvas modes, each of the plurality of canvas modes being configured to enable a respectively different associated canvas action to be taken on any of the business objects of the diagram displayed in the active area of the browser, selection of at least some of the canvas actions causing at least one target indicator to be shown, the at least one target indicator indicating where the selected canvas action may be taken in the currently displayed portion of the diagram, each business object representing a business process and including business information and associated business logic for acting upon the business information;

enabling a selection of at least one of the plurality of business objects of the diagram displayed in the active area;

providing contextual information regarding the diagram displayed in the active area in a third position of the browser;

providing hierarchical information regarding the selected at least one of the plurality of business objects in a fourth portion of the browser;

carrying out the canvas action associated with the selected canvas mode on the selected at least one of the plurality of business objects;

determining whether the carried out canvas action is solely a diagram navigation event that does not change the business process represented by the selected at least one business object or whether the carried out canvas action results in a change the business process represented by the selected at least one business object, and if the selected canvas action is determined to change the business process represented by the selected at least one business object, changing at least one of the business information and the business logic of the selected at least one business object on which the selected canvas action was carried out, and refreshing at least the active area of the browser to display a revised portion of the diagram, the revised portion of the diagram incorporating any changes to the diagram as a result of carrying out the selected canvas action on the selected at least one of the plurality of business objects.

2. The computer-implemented method of claim 1, further comprising the step of enabling the displayed portion of the diagram to be panned left, right, up or down through activation of pan controls disposed on each side of the active area of the browser.

3. The computer-implemented method of claim 1, further comprising the step of enabling the active area of the browser to display a next adjacent quadrant of the displayed diagram upon detecting a predetermined user action.

4. The computer-implemented method of claim 1, wherein at least one of the business objects includes at least one hierarchically lower business object coupled thereto in a parent-child relationship.

5. The computer-implemented method of claim 4, further comprising the step of displaying the at least one hierarchically lower business object within the active area.

6. The computer-implemented method of claim 1, further comprising a step of updating the contextual information displayed within the third portion of the browser to reflect the portion of the diagram currently displayed in the active area of the browser.

7. The computer-implemented method of claim 1, wherein each of the plurality of canvas modes enables a respectively different canvas action selected from add node, remove node, update node, move node, group nodes, view source of node, insert node, duplicate node, display node edges, connect nodes, refocus, view information about a node, define properties of a node, edit properties of a node and view node hierarchy.

8. The computer-implemented method of claim 1, further including a step of refreshing the second portion of the browser to update the diagram overview to reflect any changes to the diagram overview as a result of carrying out the selected canvas action of the selected at least one of the plurality of business objects.

9. A machine-readable medium having data stored thereon representing sequences of instructions which, when executed by computing device, causes said computing device to represent and enable manipulation of a diagram on a browser, the diagram including a representation of a plurality of interconnected business objects, by performing the steps of:

displaying at least a portion of the diagram in an active area of the browser, the active area being located in a first portion of the browser;

displaying a diagram overview in a second portion of the browser, the diagram overview including a representation of an entirety of the diagram and indicating a currently displayed portion of the diagram that is displayed in the active area;

enabling a selection of a canvas mode of a plurality of canvas modes, each of the plurality of canvas modes being configured to enable a respectively different associated canvas action to be taken on any of the business objects of the diagram displayed in the active area of the browser, selection of at least some of the canvas actions causing at least one target indicator to be shown, the at least one target indicator indicating where the selected canvas action may be taken in the currently displayed portion of the diagram, each business object representing a business process and including business information and associated business logic for acting upon the business information;

enabling a selection of at least one of the plurality of business objects of the diagram displayed in the active area;

providing contextual information regarding the diagram displayed in the active area in a third portion of the browser;

providing hierarchical information regarding the selected at least one of the plurality of business objects in a fourth portion of the browser;

carrying out the canvas action associated with the selected canvas mode on the selected at least one of the plurality of business objects;

determining whether the carried out canvas action is solely a diagram navigation event that does not change the business process represented by the selected at least one business object or whether the carried out canvas action results in a change the business process represented by the selected at least one business object, and if the selected canvas action is determined to change the business process represented by the selected at least one business object, changing at least one of the business information and the business logic of the selected at least one business object on which the selected canvas action was carried out, and refreshing at least the active area of the browser to display a revised portion of the diagram, the revised portion of the diagram incorporating any changes to the diagram as a result of carrying out the selected canvas action on the selected at least one of the plurality of business objects.

10. The medium of claim 9, further comprising the step of enabling the displayed portion of the diagram to be panned left, right, up or down through activation of pan controls disposed on each side of the active area of the browser.

11. The medium of claim 9, further comprising the step of enabling the active area of the browser to display a next adjacent quadrant of the displayed diagram upon detecting a predetermined user action.

12. The medium of claim 9, wherein at least one of the business objects includes at least one hierarchically lower business object coupled thereto in a parent-child relationship.

13. The medium of claim 12, further comprising the step of displaying the at least one hierarchically lower business object within the active area.

14. The medium of claim 9, further comprising a step of updating the contextual information displayed within the third portion of the browser to reflect the portion of the diagram currently displayed in the active area of the browser.

15. The medium of claim 9, wherein each of the plurality of canvas modes enables a respectively different canvas action selected from add node, remove node, update node, move node, group nodes, view source of node, insert node, duplicate node, display node edges, connect nodes, refocus, view information about a node, define properties of a node, edit properties of a node and view node hierarchy.

16. The medium of claim 9, further including a step of refreshing the second portion of the browser to update the diagram overview to reflect any changes to the diagram overview as a result of carrying out the selected canvas action on the selected at least one of the plurality of business objects.

17. A computer system suitable for representing and enabling manipulation of a diagram on a browser, the diagram including a representation of a plurality of interconnected business objects, comprising:
  at least one processor;
  at least one data storage device coupled to the at least one processor;
  a plurality of processes spawned by said at least one processor, the processes including processing logic for:
  displaying at least a portion of the diagram in an active area of the browser, the active area being located in a first position of the browser;
  displaying a diagram overview in a second portion of the browser, the diagram overview including a representation of an entirety of the diagram and indicating a currently displayed portion of the diagram that is displayed in the active area;
  enabling a selection of a canvas mode of a plurality of canvas modes, each of the plurality of canvas modes being configured to enable a respectively different associated canvas action to be taken on any of the business objects of the diagram displayed in the active area of the browser, selection of at least some of the canvas actions causing at least one target indicator to be shown, the at least one target indicator indicating where the selected canvas action may be taken in the currently displayed portion of the diagram, each business object representing a business process and including business information and associated business logic for acting upon the business information;
  enabling a selection of at least one of the plurality of business objects of the diagram displayed in the active area;
  providing contextual information regarding the diagram displayed in the active area in a third portion of the browser;
  providing hierarchical information regarding the selected at least one of the plurality of business objects in a fourth portion of the browser;
  carrying out the canvas action associated with the selected canvas mode on the selected at least one of the plurality of business objects;
  determining whether the carried out canvas action is solely a diagram navigation event that does not change the business process represented by the selected at least one business object or whether the carried out canvas action results in a change the business process represented by the selected at least one business object, and if the selected canvas action is determined to change the business process represented by the selected at least one business object, changing at least one of the business information and the business logic of the selected at least one business object on which the selected canvas action was carried out, and
  refreshing at least the active area of the browser to display a revised portion of the diagram, the revised portion of the diagram incorporating any changes to the diagram as a result of carrying out the selected canvas action on the selected at least one of the plurality of business objects.

18. The computer system of claim 17, further comprising the step of enabling the displayed portion of the diagram to be panned left, right, up or down through activation of pan controls disposed on each side of the active area of the browser.

19. The computer system of claim 17, further comprising the step of enabling the active area of the browser to display a next adjacent quadrant of the displayed diagram upon detecting a predetermined user action.

20. The computer system of claim 19, wherein at least one of the business objects includes at least one hierarchically lower business object coupled thereto in a parent-child relationship.

21. The computer system of claim 20, further comprising the step of displaying the at least one hierarchically lower business object within the active area.

22. The computer system of claim 17, further comprising a step of updating the contextual information displayed within the third portion of the browser to reflect the portion of the diagram currently displayed in the active area of the browser.

23. The computer system of claim 17, wherein each of the plurality of canvas modes enables a respectively different canvas action includes at least one of selected from add node, remove node, update node, move node, group nodes, view source of node, insert node, duplicate node, display node edges, connect nodes, refocus, view information about a node, define properties of a node, edit properties of a node and view node hierarchy.

24. The computer system of claim 17, further including a step of refreshing the second portion of the browser to update the diagram overview to reflect any changes to the diagram overview as a result of carrying out the selected canvas action on the selected at least one of the plurality of business objects.

25. A computer implemented method for a user to remotely and graphically manipulate representations of business objects on a browser of a thin client coupled to a server over a network, the method comprising:

displaying a diagram that includes a representation of a plurality of interconnected business objects on the browser, each business object including business information and associated business logic for acting upon the business information;

detecting a selection of one of a plurality of canvas modes by the user, each of the plurality of canvas modes being configured to enable a respectively different associated canvas action to be taken on any of the business objects of the diagram displayed on the browser;

displaying at least one target indicator in the diagram, the displayed at least one target indicator indicating where the canvas action associated with the selected canvas mode may be taken;

detecting a canvas action associated with the selected canvas mode, the detected canvas action being triggered by the user at one of the displayed target indicators on the displayed diagram on the browser;

submitting a request associated with the triggered canvas action to a controller, the controller being configured to interface between the thin client and a business object controlling application running on the server, the controller being configured to control page flow between the application and the browser on the thin client depending upon the detected canvas action;

changing the state of the business object controlling application on the server according to the detected canvas action and correspondingly changing at least one of the plurality of business objects by changing at least one of its business information and its business logic;

receiving an answer from the controller in response to the submitted request, the received answer causing the browser to refresh its display of the diagram so as to reflect at least one of the changed state of the business object controlling application, the changed business information and the changed business object.

26. The computer-implemented method of claim 25, wherein the business controlling application is coupled to a database that stores the data associated with the plurality of business objects and wherein the method further includes a step of changing the data stored within the database to reflect the changed state of the business object controlling application.

27. The computer-implemented method of claim 25, wherein the answer from the controller includes a URL of a Web page.

28. A machine-readable medium having data stored thereon representing sequences of instructions which, when executed by computing device, causes said computing device to enable a user to remotely and graphically manipulate representations of business objects on a browser of a thin client coupled to a server over a network, by performing the steps of:

displaying a diagram that includes a representation of a plurality of interconnected business objects on the browser, each business object including business information and associated business logic for acting upon the business information;

detecting a selection of one of a plurality of canvas modes by the user, each of the plurality of canvas modes being configured to enable a respectively different associated canvas action to be taken on any of the business objects of the diagram displayed on the browser;

displaying at least one target indicator in the diagram, the displayed at least one target indicator indicating where the canvas action associated with the selected canvas mode may be taken;

detecting a canvas action associated with the selected canvas mode, the detected canvas action being triggered by the user at one of the displayed target indicators on the displayed diagram on the browser;

submitting a request associated with the triggered canvas action to a controller, the controller being configured to interface between the thin client and a business object controlling application running on the server, the controller being configured to control page flow between the application and the browser on the thin client depending upon the detected canvas action;

changing the state of the business object controlling application on the server according to the detected canvas action and correspondingly changing at least one of the plurality of business objects by changing at least one of its business information and its business logic;

receiving an answer from the controller in response to the submitted request, the received answer causing the browser to refresh its display of the diagram so as to reflect at least one of the changed state of the business object controlling application, the changed business information and the changed business object.

29. The medium of claim 28, wherein the business controlling application is coupled to a database that stores the data associated with the plurality of business objects and wherein the method further includes a step of changing the data stored within the database to reflect the changed state of the business object controlling application.

30. The medium of claim 28, wherein the answer from the controller includes a URL of a Web page.

31. A computer system enabling a user to remotely and graphically manipulate representations of business objects on a browser of a thin client coupled to a server over a network, the computer system comprising:

at least one processor;

at least one data storage device coupled to the at least one processor;

a plurality of processes spawned by said at least one processor, the processes including processing logic for:

displaying a diagram that includes a representation of a plurality of interconnected business objects on the browser, each business object including business information and associated business logic for acting upon the business information;

detecting a selection of one of a plurality of canvas modes by the user, each of the plurality of canvas modes being configured to enable a respectively different associated canvas action to be taken on any of the business objects of the diagram displayed on the browser;

displaying at least one target indicator in the diagram, the displayed at least one target indicator indicating where the canvas action associated with the selected canvas mode may be taken;

detecting a canvas action associated with the selected canvas mode, the detected canvas action being triggered by the user at one of the displayed target indicators on the displayed diagram on the browser;

submitting a request associated with the triggered canvas action to a controller, the controller being configured to interface between the thin client and a business object controlling application running on the server, the controller being configured to control page flow between the application and the browser on the thin client depending upon the detected canvas action;

changing the state of the business object controlling application on the server according to the detected canvas action and correspondingly changing at least one of the plurality of business objects by changing at least one of its business information and its business logic;

receiving an answer from the controller in response to the submitted request, the received answer causing the browser to refresh its display of the diagram so as to reflect at least one of the changed state of the business object controlling application, the changed business information and the changed business object.

32. The computer system of claim 31, wherein the business controlling application is coupled to a database that stores the data associated with the plurality of business objects and wherein the method further includes a step of changing the data stored within the database to reflect the changed state of the business object controlling application.

33. The computer system of claim 31, wherein the answer from the controller includes a URL of a Web page.

\* \* \* \* \*

UNITED STATES PATENT AND TRADEMARK OFFICE
CERTIFICATE OF CORRECTION

| | | |
|---|---|---|
| PATENT NO. | : 7,596,757 B2 | Page 1 of 1 |
| APPLICATION NO. | : 10/686889 | |
| DATED | : September 29, 2009 | |
| INVENTOR(S) | : Luke Kowalski et al. | |

It is certified that error appears in the above-identified patent and that said Letters Patent is hereby corrected as shown below:

Title page, Item [*] Notice

Delete the phrase "by 725 days" and insert -- by 1179 days --.

In column 7, line 35, delete "node" and insert -- node; --, therefor.

In column 11, line 29, in claim 1, delete "position" and insert -- portion --, therefor.

In column 13, line 53, in claim 17, delete "position" and insert -- portion --, therefor.

Signed and Sealed this

Thirty-first Day of August, 2010

David J. Kappos
*Director of the United States Patent and Trademark Office*